(12) United States Patent
Ezrielev et al.

(10) Patent No.: US 12,298,895 B2
(45) Date of Patent: May 13, 2025

(54) SYSTEM AND METHOD FOR MANAGING A DATA PIPELINE USING A DIGITAL TWIN

(71) Applicant: Dell Products L.P., Round Rock, TX (US)

(72) Inventors: Ofir Ezrielev, Beer Sheva (IL); Hanna Yehuda, Acton, MA (US); Inga Sogaard, Wichita, KS (US)

(73) Assignee: Dell Products L.P., Round Rock, TX (US)

( * ) Notice: Subject to any disclaimer, the term of this patent is extended or adjusted under 35 U.S.C. 154(b) by 74 days.

(21) Appl. No.: 18/343,984

(22) Filed: Jun. 29, 2023

(65) Prior Publication Data

US 2025/0004921 A1    Jan. 2, 2025

(51) Int. Cl.
*G06F 11/36* (2025.01)
*G06F 11/3604* (2025.01)
*G06F 11/3698* (2025.01)

(52) U.S. Cl.
CPC ...... *G06F 11/3698* (2025.01); *G06F 11/3608* (2013.01)

(58) Field of Classification Search
CPC .................. G06F 11/3664; G06F 11/3608
See application file for complete search history.

(56) References Cited

U.S. PATENT DOCUMENTS 7,315,805 B2 *  1/2008  Slater ............... G06F 30/20
                                               703/19
7,788,470 B1    8/2010  Purcell
10,168,691 B2   1/2019  Zornio et al.
10,936,479 B2   3/2021  Maag et al.
11,101,037 B2   8/2021  Allen
11,221,270 B2   1/2022  Evans
11,281,453 B1   3/2022  Ramachandran
11,314,517 B2   4/2022  Keski-Valkama
(Continued)

OTHER PUBLICATIONS

Wang, Haozhe, et al., "A graph neural network-based digital twin for network slicing management," IEEE Transactions on Industrial Informatics 18.2 (2020): 1367-1376 (10 Pages).

(Continued)

*Primary Examiner* — Kamini B Patel
(74) *Attorney, Agent, or Firm* — WOMBLE BOND DICKINSON (US) LLP

(57) ABSTRACT

Methods and systems for managing operation of a data pipeline are disclosed. To manage the data pipeline, a system may include one or more data sources, a data repository, and one or more downstream consumers. Updates to the data pipeline may cause the data pipeline to become misaligned. To avoid misalignment and, therefore, failure of the data pipeline, any updates intended for implementation in the data pipeline may first be implemented in a digital twin of the data pipeline. The digital twin and the data pipeline may operate concurrently using substantially identical data. The performance of the digital twin following implementation of the potential update may be compared to the performance of the data pipeline without implementation of the potential update to obtain a performance delta. If the performance delta meets a threshold, the potential update may cause failure of the data pipeline and may be remediated prior to implementation.

20 Claims, 5 Drawing Sheets

(56) References Cited

U.S. PATENT DOCUMENTS

| | | |
|---|---|---|
| 11,341,605 B1 | 5/2022 | Singh |
| 11,853,853 B1 | 12/2023 | Beauchesne et al. |
| 12,008,046 B1 | 6/2024 | Curtis et al. |
| 12,019,902 B2 | 6/2024 | Haile |
| 12,182,098 B1 | 12/2024 | Ezrielev |
| 12,242,447 B2 | 3/2025 | Ezrielev |
| 12,242,543 B1 | 3/2025 | Pai |
| 2004/0064750 A1 | 4/2004 | Conway |
| 2006/0009881 A1 | 1/2006 | Ferber et al. |
| 2014/0037161 A1 | 2/2014 | Rucker |
| 2014/0136184 A1 | 5/2014 | Hatsek |
| 2016/0098037 A1 | 4/2016 | Zornio |
| 2016/0179063 A1 | 6/2016 | De Baynast De Septfontaines |
| 2017/0255460 A1 | 9/2017 | Frank |
| 2017/0262298 A1 | 9/2017 | Frank |
| 2018/0052708 A1 | 2/2018 | Ganesan |
| 2018/0081871 A1 | 3/2018 | Williams |
| 2019/0034430 A1 | 1/2019 | Das |
| 2019/0236204 A1 | 8/2019 | Canim |
| 2019/0361697 A1 | 11/2019 | Hu |
| 2020/0166558 A1 | 5/2020 | Weis |
| 2020/0167224 A1 | 5/2020 | Abali |
| 2020/0202478 A1 | 6/2020 | Thumpudi et al. |
| 2020/0293684 A1 | 9/2020 | Harris |
| 2020/0356428 A1 | 11/2020 | Rama |
| 2020/0394044 A1 | 12/2020 | Keski-Valkama et al. |
| 2021/0027771 A1 | 1/2021 | Hall |
| 2021/0081836 A1 | 3/2021 | Polleri |
| 2021/0116505 A1* | 4/2021 | Shu ............ G06F 30/20 |
| 2021/0117859 A1 | 4/2021 | Rogers |
| 2021/0248165 A1 | 8/2021 | Fry |
| 2021/0374143 A1 | 12/2021 | Neill |
| 2021/0385196 A1 | 12/2021 | Rahmat |
| 2021/0406110 A1 | 12/2021 | Vaid et al. |
| 2022/0014584 A1 | 1/2022 | Huetter |
| 2022/0086175 A1 | 3/2022 | Bharrat |
| 2022/0092234 A1* | 3/2022 | Karri ............ G06F 30/18 |
| 2022/0301027 A1 | 9/2022 | Basta |
| 2022/0310276 A1 | 9/2022 | Wilkinson |
| 2023/0040834 A1 | 2/2023 | Haile |
| 2023/0081880 A1 | 3/2023 | Mathur |
| 2023/0090398 A1 | 3/2023 | Upadhyay |
| 2023/0126260 A1 | 4/2023 | Elsakhawy et al. |
| 2023/0153095 A1 | 5/2023 | Rahill-Marier |
| 2023/0213930 A1* | 7/2023 | Rakshit ............ G05B 23/024 700/115 |
| 2023/0315078 A1 | 10/2023 | Sepulveda et al. |
| 2023/0418280 A1* | 12/2023 | Emery ............ G05B 23/0283 |
| 2024/0235952 A9* | 7/2024 | Hicks ............ H04L 41/16 |
| 2024/0281419 A1 | 8/2024 | Alfaras |
| 2024/0330136 A1* | 10/2024 | Furlong ............ G06F 11/261 |

OTHER PUBLICATIONS

Wang, Haozhe, et al., "A graph neural network-based digital twin for network slicing management," IEEE Transactions on Industrial Informatics 18.2 (2020): 1367-1376 (11 Pages).

Almasan, Paul, et al., "Digital Twin Network: Opportunities and challenges," arXiv preprint arXiv:2201.01144 (2022) (7 Pages).

Hu, Weifei, et al., "Digital twin: A state-of-the-art review of its enabling technologies, applications and challenges," Journal of Intelligent Manufacturing and Special Equipment 2.1 (2021): 1-34 (34 Pages).

Khan, Latif U., et al., "Digital-Twin-Enabled 6G: Vision, Architectural Trends, and Future Directions," IEEE Communications Magazine 60.1 (2022): 74-80 (7 Pages).

Nguyen, Huan X., et al., "Digital Twin for 5G and Beyond," IEEE Communications Magazine 59.2 (2021): 10-15. (12 Pages).

Wang, Danshi, et al., "The Role of Digital Twin in Optical Communication: Fault Management, Hardware Configuration, and Transmission Simulation," IEEE Communications Magazine 59.1 (2021): 133-139 (6 Pages).

Pang, Toh Yen, et al., "Developing a digital twin and digital thread framework for an 'Industry 4.0' Shipyard," Applied Sciences 11.3 (2021): 1097 (22 Pages).

Isto, Pekka, et al., "5G based machine remote operation development utilizing digital twin," Open Engineering 10.1 (2020): 265-272 (8 Pages).

Redick, William, "What is Outcome-Based Selling?" Global Performance, Web Page <https://globalperformancegroup.com/what-is-outcome-based-selling/> accessed on Feb. 14, 2023 (8 Pages).

"The Best Data Curation Tools for Computer Vision in 2022," Web Page <https://www.lightly.ai/post/data-curation-tools-2022> accessed on Feb. 14, 2023 (9 Pages).

Bebee, Troy et al., "How to detect machine-learned anomalies in real-time foreign exchange data," Google Cloud, Jun. 10, 2021, Web Page <https://cloud.google.com/blog/topics/financial-services/detect-anomalies-in-real-time-forex-data-with-ml> accessed on Feb. 14, 2023 (16 Pages).

* cited by examiner

Simulated Performance Report 400

- Data Package Before Application Programming Interface (API) 1:
  1994-08-02 12:05:01, T = 35 °C
- Data Package After API 1:
  1994-08-02 12:05:01, T = 35 °C
- Data Package After API 2:
  (Data Package Missing)

Live Performance Report 402

- Data Package Before API 1:
  1994-08-02 12:05:01, T = 35 °C
- Data Package After API 1:
  1994-08-02 12:05:01, T = 35 °C
- Data Package After API 2:
  1994-08-02 12:05:01, T = 35 °C

FIG. 4

SYSTEM AND METHOD FOR MANAGING A DATA PIPELINE USING A DIGITAL TWIN

FIELD

Embodiments disclosed herein relate generally to data management. More particularly, embodiments disclosed herein relate to systems and methods to manage data using data pipelines.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 4 shows block diagrams illustrating a system in accordance with an embodiment over time.

DETAILED DESCRIPTION

Figure 1:
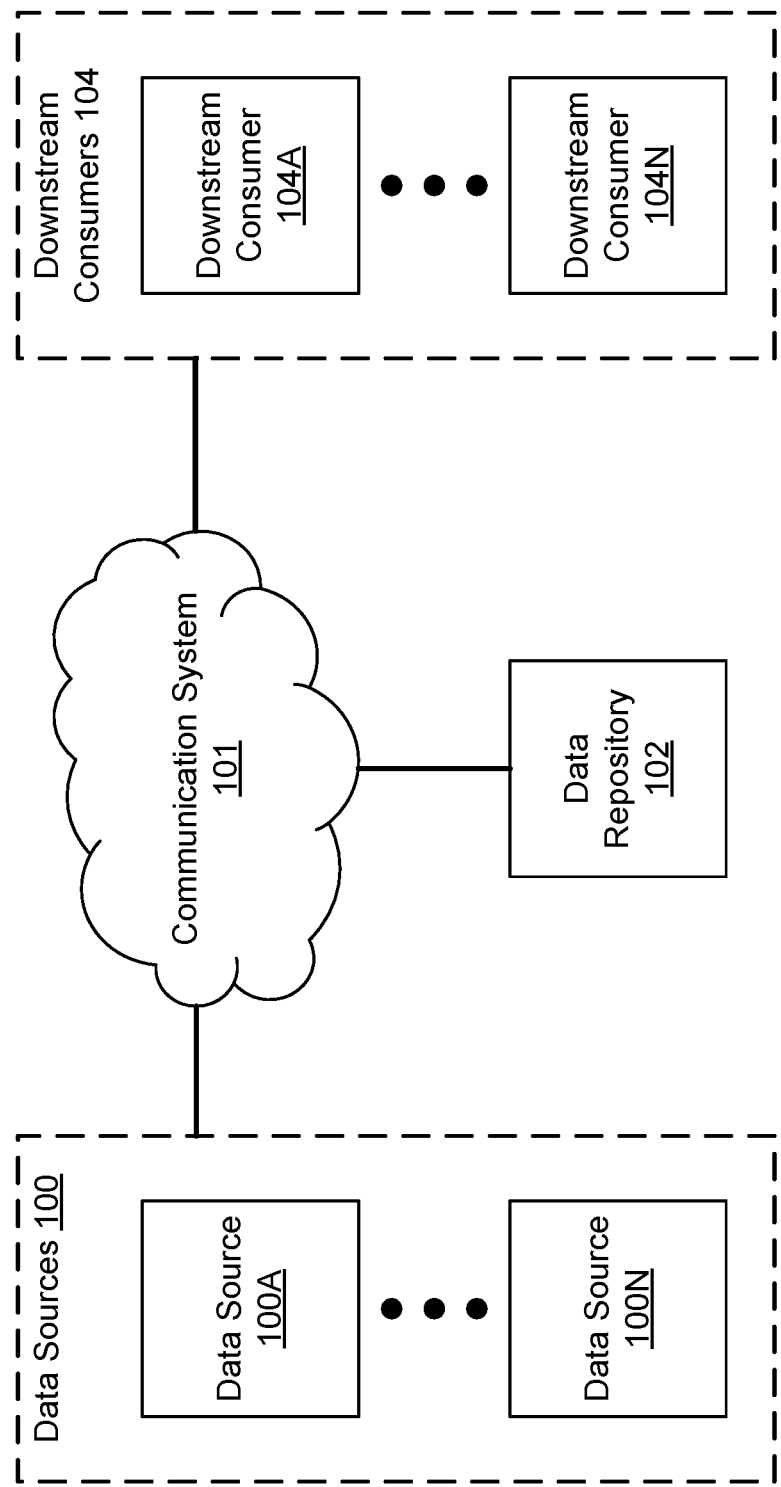
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing data pipelines. Over time, portions of a data pipeline may be updated due to integration of externally developed code, data scheme updates, etc. Such updates to the data pipeline may interrupt and/or otherwise modify performance of the data pipeline (e.g., application programming interfaces (APIs) breaking, packages of data being re-formatted in a manner unusable by a downstream consumer, etc.). Such interruptions may lead to failure of the data pipeline and, therefore, unavailability of data for use by downstream consumers of the data from the data pipeline.

To reduce the likelihood of data pipeline failure following an update to the data pipeline, the system may host and operate a digital twin of the data pipeline. The digital twin may duplicate operation of the data pipeline and may operate concurrently with the operation of the data pipeline (using the same data when a potential update is introduced). The system may utilize the digital twin to simulate operation of the data pipeline using the potential update prior to allowing the potential update to be implemented in the data pipeline.

By comparing performance of the digital twin (with the potential update implemented) to performance of the data pipeline using the same input data, the system may detect a performance delta. If the performance delta does not meet a threshold, the system may initiate an update process to implement the potential update in the data pipeline. If the performance delta meets the threshold, the system may deny the potential update and perform an action set to remediate the potential update. By doing so, failures of the data pipeline may be reduced as a result of updates to the data pipeline.

In an embodiment, a method of managing a data pipeline is provided. The method may include: obtaining a potential update intended to modify operation of at least a portion of the data pipeline; simulating the data pipeline using a digital twin of the data pipeline, the potential update, and input data to obtain a first simulated performance report, the input data being data obtained from one or more data sources associated with the data pipeline; making a determination, based on the first simulated performance report and the first live performance report, regarding whether the data pipeline will become misaligned by implementation of the potential update; in a first instance of the determination in which the data pipeline will not become misaligned by implementation of the potential update: initiating an update process for the data pipeline based on the potential update to obtain an updated data pipeline; in a second instance of the determination in which the data pipeline will become misaligned by implementation of the potential update: denying the potential update for implementation in the data pipeline; and performing an action set to remediate the potential update.

The digital twin may duplicate the operation of the data pipeline and the digital twin may operate concurrently with the data pipeline.

Simulating the data pipeline may include: modifying operation of at least a portion of the digital twin using the potential update to obtain an updated digital twin.

Simulating the data pipeline may also include: initiating, in response to obtaining the updated digital twin, generation of: the first simulated performance report by the updated digital twin; and the first live performance report by the data pipeline.

The first simulated performance report may include: a listing of records associated with the input data, each record of the listing of the records comprising: a first format of a data package prior to encountering an application programming interface associated with the digital twin; and a second format of a data package after encountering the application programming interface.

Making the determination may include: identifying at least one performance delta between operation of the updated digital twin and the operation of the data pipeline;

comparing the at least one performance delta to a threshold, the threshold indicating that the data pipeline has become misaligned when met.

Identifying the at least one performance delta may include: obtaining a difference based on the second format of the data package from the first simulated performance report and a corresponding second format of the data package from the first live performance report.

The difference may include at least one selected from a list consisting of: an indicator of a failure of the application programming interface; and a quantification of a formatting change between the second format of the data package from the first simulated performance report and the corresponding second format of the data package from the first live performance report.

The failure of the application programming interface may cause the at least one performance delta to meet the threshold and the data pipeline becoming misaligned may cause failure of the data pipeline.

Initiating the update process may include: monitoring operation of the updated data pipeline for a duration of time.

Monitoring the operation of the updated data pipeline for the duration of time may include: obtaining a second live performance report for the data pipeline for the duration of time; comparing the second live performance report to a second simulated performance report to obtain a second performance delta, the second simulated performance report being based on continued operation of the updated digital twin for the duration of time; and comparing the second performance delta to the threshold to obtain an operational status for the updated digital twin, the operational status indicating a degree to which the updated digital twin accurately duplicates the operation of the updated data pipeline.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services utilizing data obtained from any number of data sources and stored in a data repository prior to performing the computer-implemented services. The computer-implemented services may include any type and quantity of computer-implemented services. For example, the computer-implemented services may include monitoring services (e.g., of locations), communication services, and/or any other type of computer-implemented services.

To facilitate the computer-implemented services, the system may include data sources 100. Data sources 100 may include any number of data sources. For example, data sources 100 may include one data source (e.g., data source 100A) or multiple data sources (e.g., 100A-100N). Each data source of data sources 100 may include hardware and/or software components configured to obtain data, store data, provide data to other entities, and/or to perform any other task to facilitate performance of the computer-implemented services.

All, or a portion, of data sources 100 may provide (and/or participate in and/or support the) computer-implemented services to various computing devices operably connected to data sources 100. Different data sources may provide similar and/or different computer-implemented services.

For example, data sources 100 may include any number of temperature sensors positioned in an environment to collect temperature measurements according to a data collection schedule. Data sources 100 may be associated with a data pipeline and, therefore, may collect the temperature measurements, may perform processes to sort, organize, format, and/or otherwise prepare the data for future processing in the data pipeline, and/or may provide the data to other data processing systems in the data pipeline (e.g., via one or more application programming interfaces (APIs)).

Data sources 100 may provide data to data repository 102. Data repository 102 may include any number of data processing systems including hardware and/or software components configured to facilitate performance of the computer-implemented services. Data repository 102 may include a database (e.g., a data lake, a data warehouse, etc.) to store data obtained from data sources 100 (and/or other entities throughout a distributed environment).

Data repository 102 may obtain data (e.g., from data sources 100), process the data (e.g., clean the data, transform the data, extract values from the data, etc.), store the data, and/or may provide the data to other entities (e.g., downstream consumer 104) as part of facilitating the computer-implemented services.

Continuing with the above example, data repository 102 may obtain the temperature measurements from data sources 100 as part of the data pipeline. Data repository 102 may obtain the temperature measurements via a request through an API and/or via other methods. Data repository 102 may curate the temperature data (e.g., identify errors/omissions and correct them, etc.) and may store the curated temperature data temporarily and/or permanently in a data lake or other storage architecture. Following curating the temperature data, data repository 102 may provide the temperature measurements to other entities for use in performing the computer-implemented services.

Data stored in data repository 102 may be provided to downstream consumers 104. Downstream consumers 104 may utilize the data from data sources 100 and/or data repository 102 to provide all, or a portion of, the computer-implemented services. For example, downstream consumers 104 may provide computer-implemented services to users of downstream consumers 104 and/or other computing devices operably connected to downstream consumers 104.

Downstream consumers 104 may include any number of downstream consumers (e.g., 104A-104N). For example, downstream consumers 104 may include one downstream consumer (e.g., 104A) or multiple downstream consumers (e.g., 104A-104N) that may individually and/or cooperatively provide the computer-implemented services.

All, or a portion, of downstream consumers 104 may provide (and/or participate in and/or support the) computer-implemented services to various computing devices operably connected to downstream consumers 104. Different downstream consumers may provide similar and/or different computer-implemented services.

Continuing with the above example, downstream consumers 104 may utilize the temperature data from data repository 102 as input data for climate models. Specifically, downstream consumers 104 may utilize the temperature data to simulate future temperature conditions in various environments over time (e.g., to predict weather patterns, climate change, etc.).

To provide the computer-implemented services over time, the system may implement updates to the data pipeline (e.g., introducing externally developed code, modifying data schemes, etc.). The updates to the data pipeline may be introduced in response to changes to the needs of the downstream consumers, in response to an identification of a potential performance improvement for the data pipeline, etc.

However, implementation of the updates to the data pipeline may modify operation of at least a portion of the data pipeline. This modification may lead to unexpected interruptions to the data pipeline (e.g., unexpected transformations to data packages passing through the data pipeline and, therefore, misalignments between operation of an API and expectations of a user of the API, etc.). By the time the interruptions are identified, downstream consumers may have provided computer-implemented serviced based on incomplete and/or unusable data (and/or data may be unavailable to a downstream consumer due to a failure of an API, etc.).

In general, embodiments disclosed herein may provide methods, systems, and/or devices for reducing interruptions to the data pipeline caused by updates to the data pipeline. To do so, the system of FIG. 1 may host and operate a digital twin of the data pipeline. The digital twin may duplicate operations performed by the data pipeline (e.g., data transformations, data transmission using APIs, etc.). The digital twin may operate concurrently with the data pipeline when potential updates to the data pipeline are introduced (e.g., during a continuous integration/continuous delivery process, etc.) and may simulate a flow of data using input data from the data pipeline.

When a potential update to the data pipeline is identified, the system of FIG. 1 may integrate the potential update into the digital twin of the data pipeline while allowing the data pipeline to continue operating without the potential update. The simultaneous flow of data through the data pipeline and the digital twin may allow the system to compare performance of the data pipeline to a simulated performance using the digital twin. Therefore, potential interruptions to the flow of data through the data pipeline (e.g., API failures) may be identified based on a difference between the performance of the data pipeline and the simulated performance using the digital twin.

To provide the above noted functionality, the system of FIG. 1 may: (i) obtain a potential update intended to modify operation of at least a portion of the data pipeline, (ii) simulate the data pipeline using a digital twin of the data pipeline, the potential update, and input data to obtain a first simulated performance report, and/or (iii) determine, based on the first simulated performance report and the first live performance report, whether the data pipeline will become misaligned by implementation of the potential update. If the data pipeline will not become misaligned by implementation of the potential update, the system may initiate an update process for the data pipeline based on the potential update to obtain an updated data pipeline. If the data pipeline will become misaligned by implementation of the potential update, the system may: (i) deny the potential update for implementation in the data pipeline, and/or (ii) perform an action set to remediate the potential update.

Figure 2:
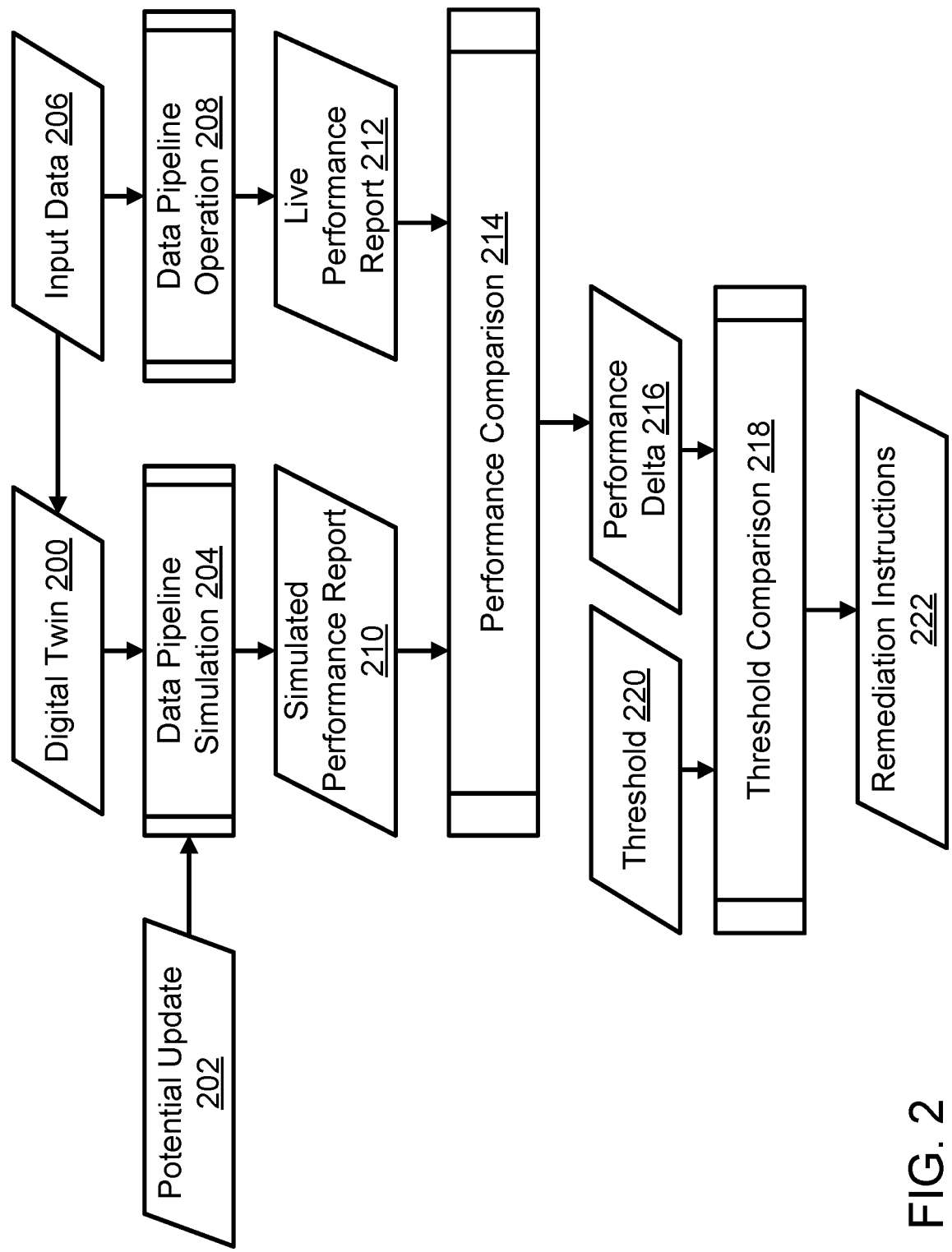
FIG. 2 shows a block diagram illustrating data flow during evaluation of a potential update to a data pipeline using a digital twin in accordance with an embodiment.
Figure 3:
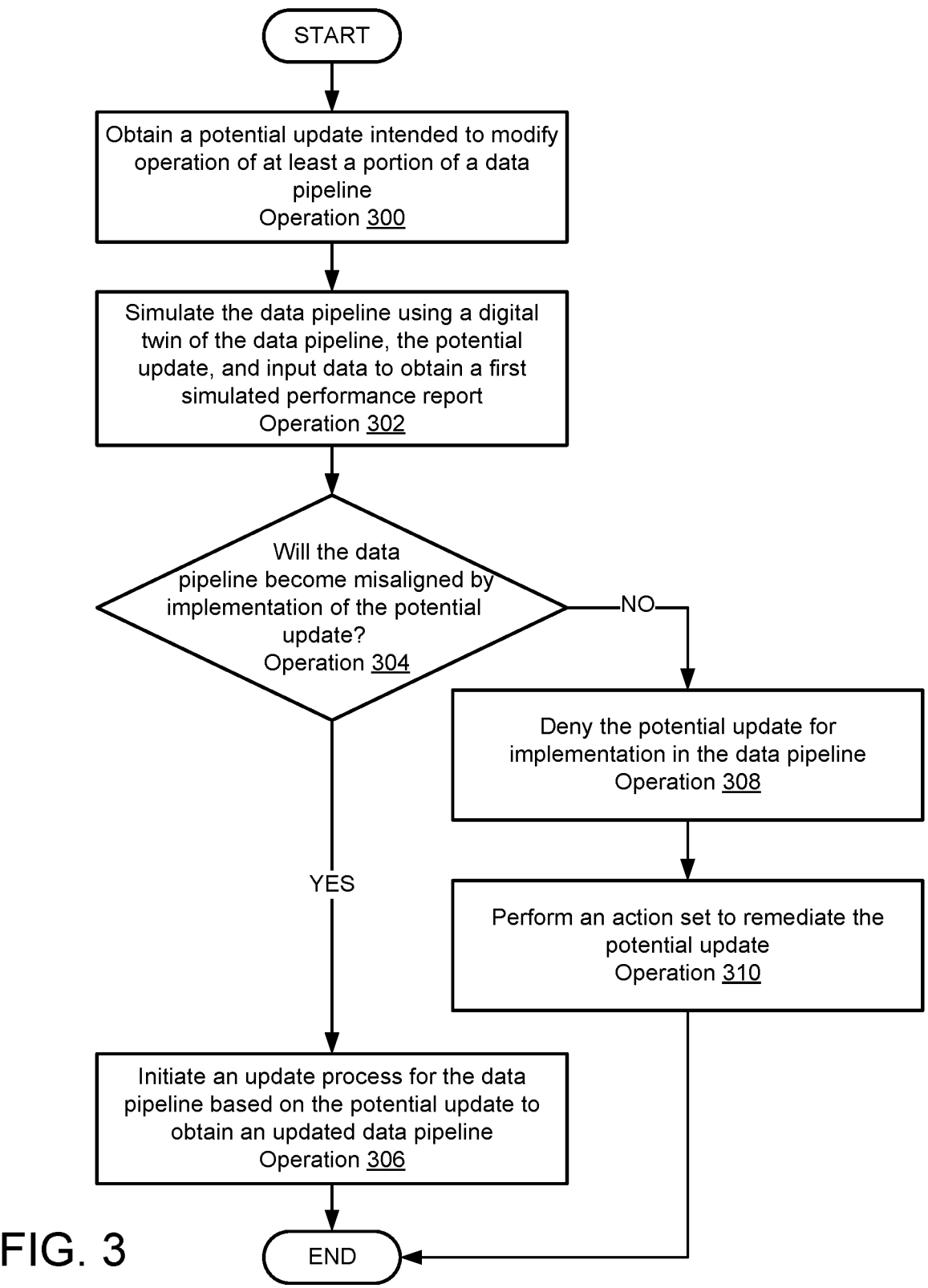
FIG. 3 shows a flow diagram illustrating a method of managing a data pipeline in accordance with an embodiment.

When performing its functionality, data sources 100, data repository 102, and/or downstream consumers 104 may perform all, or a portion, of the methods and/or actions shown in FIGS. 2-3.

Data sources 100, data repository 102, and/or downstream consumers 104 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data sources 100, data repository 102, and/or downstream consumers 104 are implemented using an internet of things (IoT) device, which may include a computing device. The IoT device may operate in accordance with a communication model and/or management model known to data sources 100, data repository 102, downstream consumers 104, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, a diagram illustrating data flows and/or processes performed in a system in accordance with an embodiment is shown in FIG. 2.

FIG. 2 shows a block diagram illustrating data flow during evaluation of a potential update to a data pipeline using a digital twin in accordance with an embodiment. The processes shown in FIG. 2 may be performed by any entity shown in the system of FIG. 1 (e.g., a data source similar to data source 100A, a data repository similar to data repository 102, a downstream consumer similar to downstream consumer 104A, etc.) and/or another entity without departing from embodiments disclosed herein.

Consider a scenario in which a data pipeline (not shown) runs in parallel (e.g., concurrently using identical data) to a digital twin of the data pipeline (e.g., digital twin 200) following an identification of potential update 202. Digital twin 200 may include a data structure with instructions to duplicate operation of the data pipeline under a range of possible environmental conditions and/or other scenarios.

Potential update 202 may include a modification to operation of at least a portion of the data pipeline (e.g., a code change, a data scheme change, etc.). Prior to implementing potential update 202 in the data pipeline, potential update 202 may be implemented in digital twin 200. To identify any potential interruptions (e.g., failure of the data pipeline due to an API break, etc.) to the operation of the data pipeline as a result of potential update 202, data pipeline simulation 204 process may include simulating an updated version of the data pipeline using digital twin 200, potential update 202, and input data 206.

Input data 206 may include data obtained from one or more data sources (e.g., similar to any of data sources 100 shown in FIG. 1) and intended to be inputted to the data pipeline. Therefore, data pipeline operation 208 process may occur simultaneously with data pipeline simulation 204 process and data pipeline operation 208 process may also utilize input data 206. Specifically, data pipeline operation 208 process may include: (i) transformations to input data 206 as needed, (ii) storing input data 206 in a data repository, (iii) providing input data 206 to a downstream consumer, etc. However, data pipeline operation 208 process may not include potential update 202.

The introduction of potential update 202 into digital twin 200 may initiate generation of simulated performance report 210 as a result of data pipeline simulation 204 process and live performance report 212 as a result of data pipeline operation 208 process.

Simulated performance report 210 may include data related to a progression of a data package (not shown) of input data 206 through digital twin 200 while incorporating potential update 202. Simulated performance report 210 may include, for example, a data structure listing the format of the data package at different stages of digital twin 200. Specifically, simulated performance report 210 may include a listing of records associated with input data 206, each record of the listing of the records including: (i) a first format of the data package prior to encountering an API associated with digital twin 200, and (ii) a second format of the data package after encountering the API. Consequently, every time the data package passes through an API (e.g., transmission from the data repository to the downstream consumer), the format of the data package and/or metadata related to the data package may be recorded in the data structure. By doing so, any failure of the data pipeline (e.g., due to a misalignment between operation of the API and expectations for the operation of the API) may appear in simulated performance report 210 as a missing data package, etc.

Similarly, live performance report 212 may follow the same data package of input data 206 as it progresses through the data pipeline. Live performance report 212 may include a data structure with entries corresponding to entries in simulated performance report 210. Therefore, the format of the data package (and/or other characteristics of the data package) may be compared as it progresses through digital twin 200 and the data pipeline. By doing so, any potential undesirable modifications to the data package as a result of the implementation of potential update 202 (e.g., a formatting change that makes the data package unusable, a broken API, etc.) may be identified.

Performance comparison 214 process may include comparing simulated performance report 210 and live performance report 212. For example, performance comparison 214 process may include identifying an API failure (and/or other disruptions) indicated by simulated performance report 210. In addition, performance comparison 214 process may include comparing corresponding entries in simulated performance report 210 and live performance report 212 to identify formatting changes and/or other changes that may be the result of potential update 202.

Performance comparison 214 process may include generating performance delta 216. Performance delta 216 may include a data structure indicating a difference identified between simulated performance report 210 and live performance report 212. The difference may include: (i) an indicator of a failure of an API, (ii) a quantification of a formatting change between the second format of the data package from simulated performance report 210 and a corresponding second format of the data package from live performance report 212, and/or (iii) any other differences between other aspects of simulated performance report 210 and live performance report 212. For example, the quantification of the formatting change may include a percent difference between formatting of the data package in simulated performance report 210 and formatting of the data package in live performance report 212.

The data pipeline may fail if, for example, an API failure occurs due to performance delta 216. To determine whether performance delta 216 includes an indicator of data pipeline failure, threshold comparison 218 process may compare performance delta 216 to threshold 220. Threshold 220 may include any quantification of the difference in performance delta 216 considered acceptable (e.g., based on needs of a downstream consumer, and/or any other criteria). Threshold 220 may indicate, for example, that no API breaks are considered acceptable. In addition, threshold 220 may indicate that the data pipeline has become misaligned when met and the data pipeline becoming misaligned may cause failure of the data pipeline.

If performance delta 216 meets threshold 220, threshold comparison 218 process may result in generation of remediation instructions 222. Remediation instructions 222 may include, for example, an indication of a portion of the data pipeline that may be interrupted by potential update 202. Remediation instructions 222 may be provided to any entity responsible for modifying potential update 202 to account for the potential interruptions. Consequently, remediation instructions 222 may facilitate implementation of potential update 202 while avoiding potential interruptions and/or other issues throughout the data pipeline.

If performance delta 216 does not meet threshold 220, the system may implement potential update 202 into the data pipeline. Following implementation of potential update 202 into the data pipeline, the system may continue to monitor operation of the data pipeline via generation of a second live performance report and a second simulated performance report (not shown). The second live performance report may be based on operation of the data pipeline following implementation of potential update 202 for a duration of time. The second simulated performance report may be based on continued operation of the digital twin for the duration of time (also using potential update 202).

A second performance delta may be obtained (not shown) using the second live performance report and the second simulated performance report. The second performance delta may be compared to threshold 220. An operational status of digital twin 200 may be obtained based on the comparison (not shown). The operational status may indicate a degree to which digital twin 200 accurately duplicates the operation of the data pipeline following implementation of the potential update. The operational status may be used, for example, to make further modifications to potential update 202 (if needed) and/or to diagnose potential operational issues for digital twin 200.

In an embodiment, the one or more entities performing the operations shown in FIG. 2 are implemented using a processor adapted to execute computing code stored on a persistent storage that when executed by the processor performs the functionality of the system of FIG. 1 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform various methods to manage operation of data processing systems throughout a distributed environment. FIG. 3 illustrate methods that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing a data pipeline in accordance with an embodiment is shown. The method may be performed, for example, by a data source, data repository, downstream consumer, and/or any other entity.

At operation 300, a potential update intended to modify operation of at least a portion of a data pipeline is obtained.

The potential update may be obtained by: (i) reading the potential update from storage, (ii) generating the potential update, (iii) receiving the potential update as a transmission from an entity responsible for generating potential updates, and/or (iv) other methods.

At operation 302, the data pipeline is simulated using a digital twin of the data pipeline, the potential update, and input data to obtain a first simulated performance report.

Simulating the data pipeline may include: (i) modifying operation of at least a portion of the digital twin using the potential update to obtain an updated digital twin, (ii) utilizing the input data for the operation of the updated digital twin, and/or (iii) other actions.

Modifying the operation of at least the portion of the digital twin using the potential update may include: (i) implementing a change (e.g., a code change, a data scheme change, etc.) to the digital twin, the change being indicated by the potential update, (ii) providing the potential update to another entity responsible for implementing the change, and/or (iii) other methods.

Implementing the change may include: (i) modifying the contents of a data structure including instructions for implementing software associated with the digital twin using the potential update, (ii) transmitting the potential update to another entity responsible for implementing updates to the digital twin, and/or (iii) may include other actions without departing from embodiments disclosed herein.

Simulating the data pipeline may also include initiating, in response to obtaining the updated digital twin, generation of: (i) the first simulated performance report by the updated digital twin, and/or (ii) the first live performance report by the data pipeline.

Initiating generation of the first simulated performance report may include: (i) providing instructions to the digital twin to initiate generation of the first simulated performance report, (ii) providing instructions to another entity to initiate the generation of the first simulated performance report, (iii) generating the first simulated performance report, and/or (iv) other methods.

Generating the first simulated performance report may include: (i) generating a data structure to be treated as the first simulated performance report, (ii) obtaining the first format of the data package from the digital twin, (iii) encapsulating the first format in the data structure, (iv) obtaining the second format of the data package from the digital twin, (v) encapsulating the second format in the data structure, and/or (vi) other actions.

Initiating generation of the first live performance report may include: (i) providing instructions to the data pipeline to initiate generation of the first live performance report, (ii) providing instructions to another entity to initiate the generation of the first live performance report, (iii) generating the first live performance report, and/or (iv) other methods.

Generating the first live performance report may include operations similar to those described above with respect to the first simulated performance report using the input data and the data pipeline.

At operation 304, it is determined whether the data pipeline will become misaligned by implementation of the potential update based on the first simulated performance report and the first live performance report. Determining whether the data pipeline will become misaligned by implementation of the potential update may include: (i) identifying at least one performance delta between the operation of the updated digital twin and the operation of the data pipeline, (ii) comparing the at least one performance delta to a threshold, the threshold indicating that the data pipeline has become misaligned when met, and/or (iii) other methods.

Identifying the at least one performance delta may include: (i) obtaining a difference based on the second format of the data package from the first simulated performance report and a corresponding second format of the data package from the first live performance report, and/or (ii) other actions to identify other forms of the at least one performance delta without departing from embodiments disclosed herein.

Obtaining the difference may include: (i) obtaining the second format of the data package from the first simulated performance report, (ii) obtaining the second format of the data package from the first live performance report. (iii) quantifying a degree of deviation between the second format of the data package from the first simulated performance report and the second format of the data package from the first live performance report (e.g., a percent difference, etc.), and/or (iv) encapsulating the degree of deviation in a data structure and treating the data structure as the difference.

Obtaining the difference may also include identifying an indicator that an API has failed. Identifying that an API has failed may include failing to obtain the second format of the data package from the first simulated performance report.

Comparing the performance delta to the threshold may include: (i) obtaining the threshold, (ii) comparing the difference to the threshold, and/or (iii) other actions.

Obtaining the threshold may include: (i) reading the threshold from storage, (ii) requesting the threshold from another entity responsible for generating and/or storing thresholds, (iii) generating the threshold based on preferences of a downstream consumer, and/or (iv) other methods.

Comparing the difference to the threshold may include: (i) determining whether any API failures are indicated by the difference, (ii) providing the difference and the threshold to another entity responsible for comparing the difference to the threshold, and/or (iii) other actions.

If the data pipeline will not become misaligned by implementation of the potential update, the method may proceed to operation 306.

At operation 306, an update process for the data pipeline is initiated based on the potential update to obtain an updated data pipeline.

Initiating the update process may include: (i) initiating implementation of the potential update into the data pipeline, (ii) continuing concurrent operation of the updated data pipeline and the updated digital twin, (iii) monitoring the operation of the updated data pipeline for a duration of time, and/or (vi) other actions without departing from embodiments disclosed herein.

Initiating implementation of the potential update into the data pipeline may include: (i) modifying software and/or one or more data structures to reflect the potential update, (ii) providing the potential update to another entity along with instructions for implementing the potential update into the data pipeline, (iii) re-routing at least a portion of the data pipeline through at least a portion of the updated digital twin (e.g., via modifying one or more communication channels), and/or (iv) other methods.

Monitoring the operation of the updated data pipeline for the duration of time may include: (i) obtaining a second live performance report for the data pipeline for the duration of time, (ii) comparing the second live performance report to a second simulated performance report to obtain a second performance delta, the second simulated performance report being based on the continued operation of the digital twin for the duration of time, and/or (iii) comparing the second performance delta to the threshold to obtain an operational status for the digital twin.

The second live performance report may be obtained using methods similar to those described above with relation to the first live performance report in operation 302.

Comparing the second live performance report to the second simulated performance report to obtain the second performance delta may be performed via methods similar to those described above with respect to the first performance delta in operation 304.

Comparing the second performance delta to the threshold to obtain an operational status for the digital twin may include: (i) determining whether the second performance delta meets the threshold, (ii) if the second performance delta meets the threshold, generating an operational status indicating non-nominal operation of the digital twin, and/or (iii) if the second performance delta does not meet the threshold, generating an operational status indicating nominal operation of the digital twin.

Obtaining the operational status of the digital twin may include other operations and may be based on other data without departing from embodiments disclosed herein.

The method may end following operation 306.

Returning to operation 304, the method may proceed to operation 308 if the data pipeline will become misaligned by implementation of the potential update.

At operation 308, the potential update is denied for implementation in the data pipeline. Denying the potential update for implementation in the data pipeline may include: (i) not initiating modification of the data pipeline using the potential update, (ii) providing instructions to another entity not to utilize the potential update to modify the data pipeline, (iii) modifying a data structure associated with the potential update to indicate that the potential update is not approved for implementation, and/or (iv) other methods.

At operation 310, an action set is performed to remediate the potential update.

Performing the action set to remediate the potential update may include: (i) modifying the potential update (e.g., via updating the data structure associated with the potential update to avoid the source of the undesirable first performance delta, etc.), (ii) providing instructions to another entity to modify the potential update based on the first performance delta, (iii) obtaining an updated potential update based on the potential update and the first performance delta, (iv) implementing the updated potential update in the data pipeline, (v) implementing the updated potential update in the digital twin to obtain a second updated digital twin and using the second updated digital twin to simulate operation of the data pipeline using the second potential update, and/or (vi) other methods.

The method may end following operation 310.

Turning to FIG. 4, this figure may illustrate a system similar to that of FIG. 1 in accordance with an embodiment. FIG. 4 may show actions performed by the system over time. The system may include a data pipeline made up of any number of data sources, a data repository, and/or any number of downstream consumers (not shown).

A potential update to the data pipeline may be introduced and, prior to implementing the potential update, the system may simulate operation of the data pipeline using the potential update and a digital twin of the data pipeline. Therefore, the digital twin and the data pipeline may ingest identical input data and may generate simulated performance report 400 and live performance report 402 respectively.

Simulated performance report 400 and live performance report 402 may track the progress of a data package, the data package including a timestamp and a corresponding temperature measurement obtained from one or more of the data sources. The data package may include the following information: 1994 Aug. 2, T=35° C.

The data pipeline may include any number of APIs to facilitate communications between the portions of the data pipeline (e.g., the one or more data sources, the data repository, the one or more downstream consumers, etc.). Simulated performance report 400 may include a listing of records including: (i) a format of the data package before and after encountering a first API, and (ii) a format of the data package after encountering a second API using the digital twin. Similarly, live performance report 402 may include: (i) a format of the data package before and after encountering a first API, and (ii) a format of the data package after encountering a second API using the data pipeline.

As shown by FIG. 4, the format of the data package may be unchanged after encountering API 1 and after encountering API 2 in live performance report 402. However, the data package may be missing after encountering API 2 in simulated performance report 400. A missing data package may indicate that API 2 in the data pipeline is broken (e.g., has failed). Therefore, the potential update may cause failure of the data pipeline if implemented without modification.

The system may determine whether a performance delta indicated by the difference between simulated performance report 400 and live performance report 402 meets a threshold. If the performance delta meets the threshold (e.g., via failure of one or more APIs), the potential update may not be implemented in the data pipeline and the potential update may be modified to remediate the performance delta.

Figure 5:
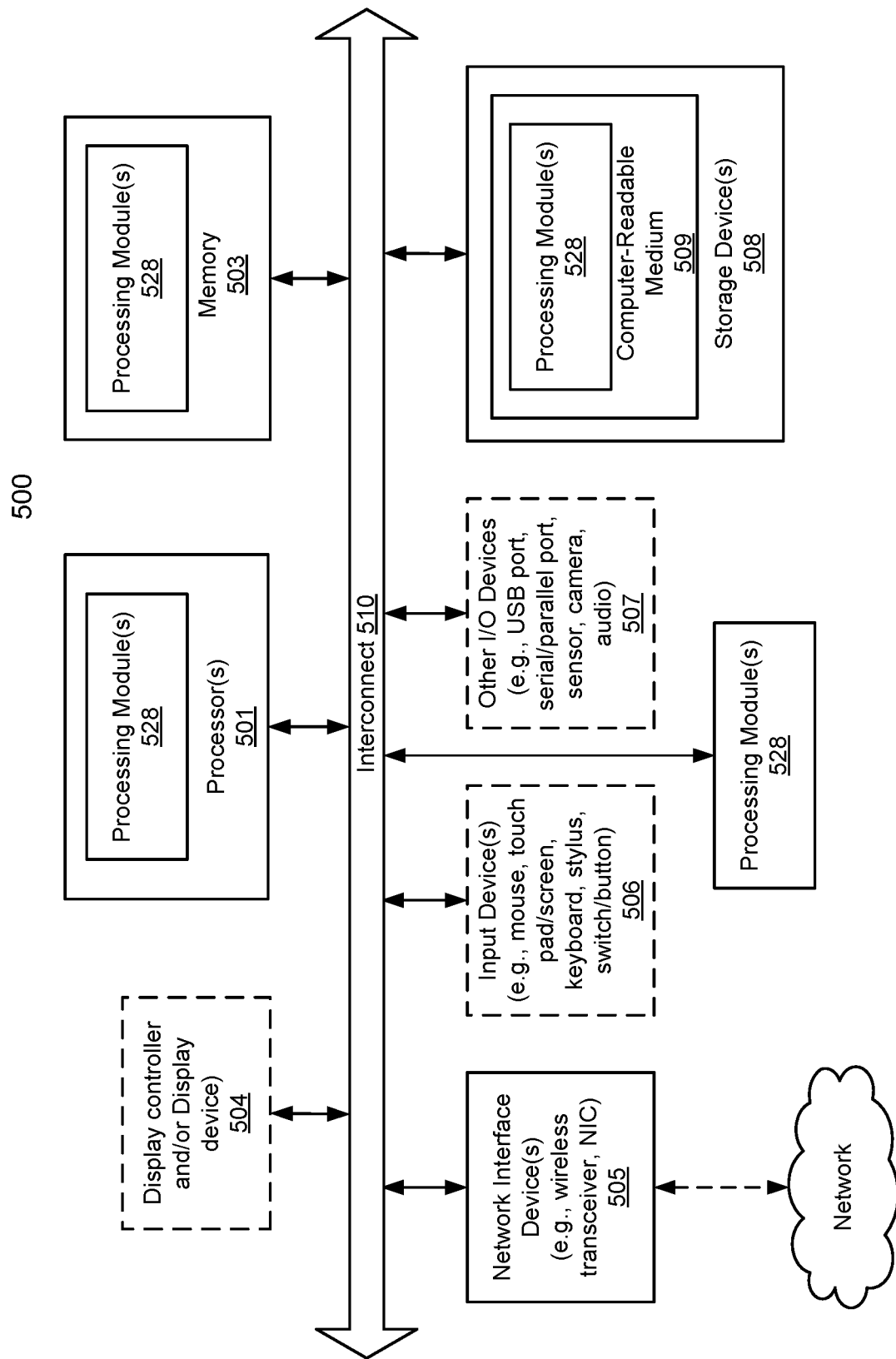
FIG. 5 shows a block diagram illustrating a data processing system in accordance with an embodiment.

Any of the components illustrated in FIGS. 1-4 may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing a data pipeline, the method comprising:
   obtaining a potential update intended to modify operation of at least a portion of the data pipeline;
   simulating the data pipeline using a digital twin of the data pipeline, the potential update, and input data to obtain a first simulated performance report, the input data being data obtained from one or more data sources associated with the data pipeline;
   making a determination, based on the first simulated performance report and a first live performance report, regarding whether the data pipeline will become misaligned by implementation of the potential update, the first live performance report being based on operation of the data pipeline using the input data;
   in a first instance of the determination in which the data pipeline will not become misaligned by implementation of the potential update:
      initiating an update process for the data pipeline based on the potential update to obtain an updated data pipeline;
   in a second instance of the determination in which the data pipeline will become misaligned by implementation of the potential update:
      denying the potential update for implementation in the data pipeline; and
      performing an action set to remediate the potential update.

2. The method of claim 1, wherein the digital twin duplicates the operation of the data pipeline and the digital twin operates concurrently with the data pipeline.

3. The method of claim 2, wherein simulating the data pipeline comprises:
   modifying operation of at least a portion of the digital twin using the potential update to obtain an updated digital twin.

4. The method of claim 3, wherein simulating the data pipeline further comprises:
   initiating, in response to obtaining the updated digital twin, generation of:

the first simulated performance report by the updated digital twin; and the first live performance report by the data pipeline.

5. The method of claim 4, wherein the first simulated performance report comprises:
a listing of records associated with the input data, each record of the listing of the records comprising:
a first format of a data package prior to encountering an application programming interface associated with the digital twin; and
a second format of a data package after encountering the application programming interface.

6. The method of claim 5, wherein making the determination comprises:
identifying at least one performance delta between operation of the updated digital twin and the operation of the data pipeline;
comparing the at least one performance delta to a threshold, the threshold indicating that the data pipeline has become misaligned when met.

7. The method of claim 6, wherein identifying the at least one performance delta comprises:
obtaining a difference based on the second format of the data package from the first simulated performance report and a corresponding second format of the data package from the first live performance report.

8. The method of claim 7, wherein the difference comprises at least one selected from a list consisting of:
an indicator of a failure of the application programming interface; and
a quantification of a formatting change between the second format of the data package from the first simulated performance report and the corresponding second format of the data package from the first live performance report.

9. The method of claim 8, wherein the failure of the application programming interface causes the at least one performance delta to meet the threshold and the data pipeline becoming misaligned causes failure of the data pipeline.

10. The method of claim 9, wherein initiating the update process comprises:
monitoring operation of the updated data pipeline for a duration of time.

11. The method of claim 10, wherein monitoring the operation of the updated data pipeline for the duration of time comprises:
obtaining a second live performance report for the data pipeline for the duration of time;
comparing the second live performance report to a second simulated performance report to obtain a second performance delta, the second simulated performance report being based on continued operation of the updated digital twin for the duration of time; and
comparing the second performance delta to the threshold to obtain an operational status for the updated digital twin, the operational status indicating a degree to which the updated digital twin accurately duplicates the operation of the updated data pipeline.

12. A non-transitory machine-readable medium having instructions stored therein, which when executed by a processor, cause the processor to perform operations for managing a data pipeline, the operations comprising:
obtaining a potential update intended to modify operation of at least a portion of the data pipeline;
simulating the data pipeline using a digital twin of the data pipeline, the potential update, and input data to obtain a first simulated performance report, the input data being data obtained from one or more data sources associated with the data pipeline;
making a determination, based on the first simulated performance report and a first live performance report, regarding whether the data pipeline will become misaligned by implementation of the potential update, the first live performance report being based on operation of the data pipeline using the input data;
in a first instance of the determination in which the data pipeline will not become misaligned by implementation of the potential update:
initiating an update process for the data pipeline based on the potential update to obtain an updated data pipeline;
in a second instance of the determination in which the data pipeline will become misaligned by implementation of the potential update:
denying the potential update for implementation in the data pipeline; and
performing an action set to remediate the potential update.

13. The non-transitory machine-readable medium of claim 12, wherein the digital twin duplicates the operation of the data pipeline and the digital twin operates concurrently with the data pipeline.

14. The non-transitory machine-readable medium of claim 13, wherein simulating the data pipeline comprises:
modifying operation of at least a portion of the digital twin using the potential update to obtain an updated digital twin.

15. The non-transitory machine-readable medium of claim 14, wherein simulating the data pipeline further comprises:
initiating, in response to obtaining the updated digital twin, generation of:
the first simulated performance report by the updated digital twin; and
the first live performance report by the data pipeline.

16. The non-transitory machine-readable medium of claim 15, wherein the first simulated performance report comprises:
a listing of records associated with the input data, each record of the listing of the records comprising:
a first format of a data package prior to encountering an application programming interface associated with the digital twin; and
a second format of a data package after encountering the application programming interface.

17. A data processing system, comprising:
a processor; and
a memory coupled to the processor to store instructions, which when executed by the processor, cause the processor to perform operations for managing a data pipeline, the operations comprising:
obtaining a potential update intended to modify operation of at least a portion of the data pipeline;
simulating the data pipeline using a digital twin of the data pipeline, the potential update, and input data to obtain a first simulated performance report, the input data being data obtained from one or more data sources associated with the data pipeline;
making a determination, based on the first simulated performance report and a first live performance report, regarding whether the data pipeline will become misaligned by implementation of the potential update, the first live performance report being based on operation of the data pipeline using the input data;

in a first instance of the determination in which the data pipeline will not become misaligned by implementation of the potential update:

initiating an update process for the data pipeline based on the potential update to obtain an updated data pipeline;

in a second instance of the determination in which the data pipeline will become misaligned by implementation of the potential update:

denying the potential update for implementation in the data pipeline; and performing an action set to remediate the potential update.

18. The data processing system of claim 17, wherein the digital twin duplicates the operation of the data pipeline and the digital twin operates concurrently with the data pipeline.

19. The data processing system of claim 18, wherein simulating the data pipeline comprises:

modifying operation of at least a portion of the digital twin using the potential update to obtain an updated digital twin.

20. The data processing system of claim 19, wherein simulating the data pipeline further comprises:

initiating, in response to obtaining the updated digital twin, generation of:

the first simulated performance report by the updated digital twin; and the first live performance report by the data pipeline.

* * * * *